2,978,392
ELECTROLYTIC PROCESS

Alexander F. MacLean, and Charles C. Hobbs, Jr., Corpus Christi, Tex., assignors to Celanese Corporation of America, New York, N.Y., a corporation of Delaware No Drawing. Filed Aug. 12, 1957, Ser. No. 677,772

7 Claims. (Cl. 204—59)

This invention relates to the oxidation of organic compounds.

It is an object of this invention to provide a new and improved process for the oxidation of organic compounds by reaction of such compounds with oxygen.

Other objects of this invention will be apparent from the following detailed description and claims. In this description and claims all proportions are by weight unless otherwise indicated.

In accordance with one aspect of this invention the reaction between an organic compound and oxygen is accelerated by passing a small electric current through the reaction mixture. It is believed that this acceleration is due to the formation, by electrolysis, of free radicals which initiate oxidation chain reactions. In any event, the increase in oxidation rate is very much greater than that which could be due to simple electrolytic oxidation. The amount of current used is insufficient to effect substantial electrolytic oxidation, but products what might be termed an electrolytically induced oxidation.

The organic compound being oxidized preferably contains an easily abstracted hydrogen atom. Examples of such compounds are acetaldehyde, or other aldehydes such as propionaldehyde or benzaldehyde, cyclohexanol and other alcohols such as isopropanol, or isopropyl benzene or other aliphatic-substituted aromatic hydrocarbons.

Preferably, the oxidation reaction is carried out while the compound being oxidized is in liquid phase. According to one mode of operation the oxygen, which may be supplied as substantially pure oxygen or diluted oxygen (e.g. air), is bubbled through the liquid to saturate it, after which the oxygen-saturated liquid is passed between electrodes. If desired, an oxidation-resistant solvent, such as acetic acid or acetonitrile may be present during the reaction. Similarly, an oxidation catalyst such as a cobalt or manganese compound may be present in small amounts; however, the presence of a catalyst introduces undesirable residues into the product, is not necessary, and is generally to be avoided.

In addition, a small amount of another, more conductive, compound which also forms free radicals on electrolysis may be added to the reaction mixture containing the compound to be oxidized; for example, acetaldehyde may have added thereto 1% (based on the weight of acetaldehyde) of triethylamine formate or triethylamine acetate.

The temperature of reaction may be varied widely. One suitable range for the oxidation of acetaldehyde is —30 to +50° C. The reaction can be carried out under atmospheric, subatmospheric or superatmospheric pressure.

As stated, the amount of electricity used is preferably relatively small, being such that the increase in the number of moles of oxygen reacted due to the passage of the current is in excess of about 100 moles per faraday, e.g. about 100 to 5000 moles of oxygen per faraday. The current density between the electrodes is preferably less than about 10 milliamperes per square centimeter. For optimum results direct current should be used; alternating current, even at frequencies as low as 60 cycles, is considerably less effective.

The voltages applied to the electrodes need not be high, merely sufficient to effect the desired flow of current. This will depend, of course, on the conductivity of the mixture being treated. In this connection, it has been found that even substantially pure, anhydrous acetaldehyde saturated with oxygen is sufficiently conductive to produce the desired results. The conductivity of the acetaldehyde is probably due to ionization of its enol form in the presence of traces of water, although large amounts of water should be avoided in this case. The addition of traces of electrolytes, such as sulfuric acid, greatly increases the conductivity. One suitable range of conductivity is about $2 \times 10^{-5}$ mhos to $10^{-3}$ mhos.

The following examples are given to illustrate this invention further.

Example I

Freshly distilled substantially pure acetaldehyde was saturated with dry cylinder oxygen by mixing it with the oxygen in a centrifugal pump at a temperature of —10° C. The liquid, oxygen-saturated, acetaldehyde was then passed to a cell, maintained at a temperature of —10° C., where it flowed between two electrodes of 20 gauge platinum wire, each extending 6 inches into the liquid, spaced ¾ inch apart. The liquid leaving the cell was recycled continuously; that is, it was returned continuously to the centrifugal pump for further saturation with oxygen and, from the pump, fed continuously to the cell. The total volume of recycling liquid in the system was 150 ml.

When no electrical potential was applied to the electrodes the rate of oxidation was 0.36 mole of oxygen per liter of reaction mixture per hour. When the example was repeated, except that a potential of 200 volts was applied to the electrodes, causing a direct current of about 1 milliampere to flow, at a current density of about 10 ma. per sq. cm., the rate of oxidation was increased to 1.17 moles of oxygen per liter per hour. In each case, the oxidation reaction resulted in the formation of peracetic acid and acetic acid and the efficiency of conversion of the acetaldehyde to these products was about 100%.

The process of this example was carried out at substantially atmospheric pressure.

Example II

Example I was repeated except that parallel carbon plate electrodes, each 4 square inches in area, spaced ½ inch apart, were substituted for the platinum electrodes. When no potential was applied to the electrodes the rate of oxidation was 0.57 mole of oxygen per liter per hour. With 800 volts applied to electrodes, causing a direct current of 4 milliamperes to flow, the rate of oxidation increased to 1.07 moles of oxygen per liter per hour.

It is to be understood that the foregoing detailed description is merely given by way of illustration and that many variations may be made therein without departing from the spirit of our invention.

Having described our invention, what we desire to secure by Letters Patent is:

1. In the process for the production of oxygenated organic compounds by oxidation of an oxidizable organic compound by reaction of a mixture of molecular oxygen and said oxidizable organic compound, said oxygen being supplied independently of the passage of an electric current through said mixture, the improvement which comprises increasing the rate of reaction by passing a small electrolytic current through said mixture, the current density being not higher than about 10 ma. per sq. cm. and the rate of oxygen supply being at least 100 moles per faraday of charge.

2. Process as set forth in claim 1 in which said mixture comprises said oxidizable compound in liquid phase and saturated with oxygen.

3. Process as set forth in claim 1 in which said oxidizable organic compound is an aldehyde.

4. Process as set forth in claim 1 in which said oxidizable organic compound is acetaldehyde.

5. Process as set forth in claim 1 in which said mixture comprises acetaldehyde in liquid phase and saturated with oxygen.

6. Process as set forth in claim 4 in which the temperature of reaction is −30 to +50° C.

7. Process as set forth in claim 1 in which the current is a direct current.

References Cited in the file of this patent

UNITED STATES PATENTS

| | | |
|---|---|---|
| 2,786,022 | Wolf | Mar. 19, 1957 |

FOREIGN PATENTS

| | | |
|---|---|---|
| 3,826 of 1886 | Great Britain | Feb. 1, 1887 |
| 3,749 of 1898 | Great Britain | Dec. 3, 1898 |
| 614,984 | Great Britain | Dec. 30, 1948 |

OTHER REFERENCES

Transactions Electrochemical Soc., vol. 71 (1937), pp. 505–517.

Transactions Electrochemical Soc., vol. 59 (1931), pp. 237–247.